June 1, 1971     R. P. STEVENS     3,582,429
PLASTIC FASTENER MEANS
Filed May 8, 1967
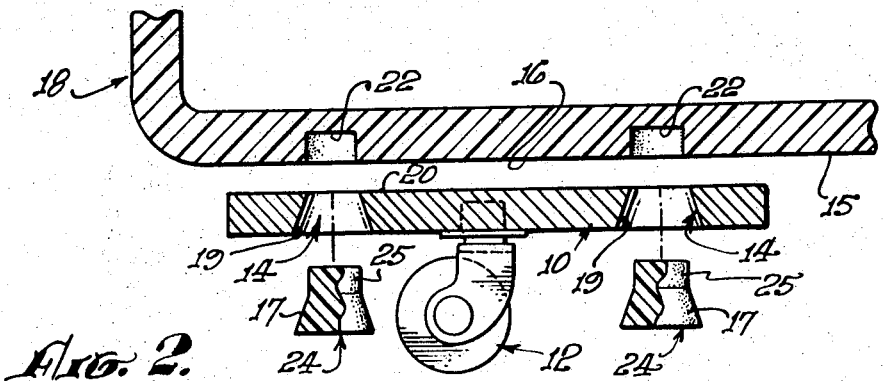
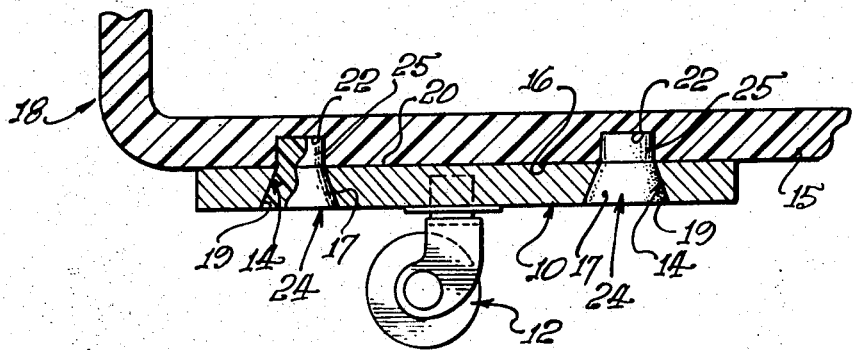
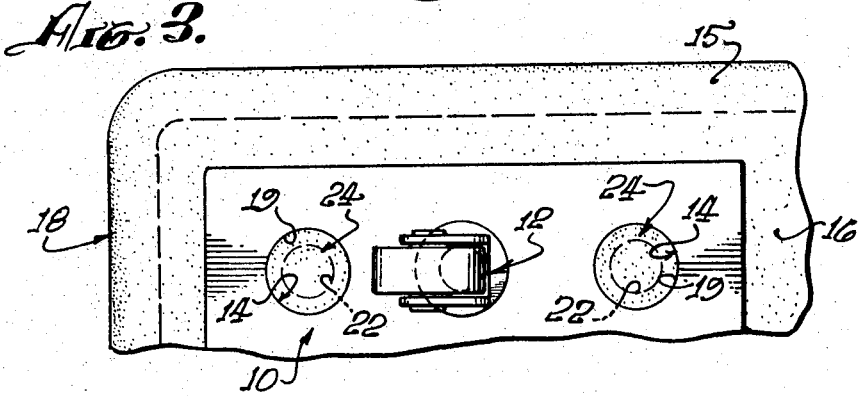
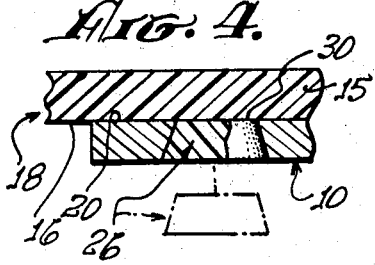
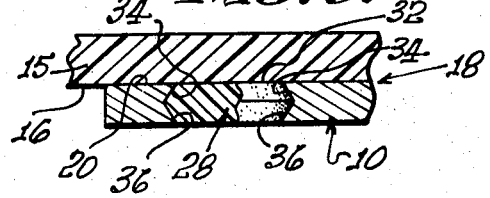
INVENTOR.
RICHARD P. STEVENS,
By His Attorneys.

United States Patent Office 3,582,429
Patented June 1, 1971

3,582,429
PLASTIC FASTENER MEANS
Richard P. Stevens, Monterey Park, Calif., assignor to Universal By-Products, Inc., Sun Valley, Calif.
Filed May 8, 1967, Ser. No. 636,726
Int. Cl. B32b 31/12
U.S. Cl. 156—293                     2 Claims

ABSTRACT OF THE DISCLOSURE

A means for fastening together plastic and non-plastic members wherein an independent plastic fastener is disposed through the non-plastic member and affixed to the plastic member, said fastener exerting an inwardly directed holding force on said non-plastic member whereby said plastic member and said non-plastic member are retained in a predetermined relationship.

BACKGROUND OF THE INVENTION

(1) Field of the invention

This invention relates to means and methods for fastening together incompatible materials and more particularly to an improved means for attaching a non-plastic member to a plastic member so as to retain the strength and integrity of the plastic member when subjected to heavy loads and severe mechanical shock.

(2) Description of the prior art

A review of the prior art readily discloses numerous methods and means for fastening together objects of dissimilar material, as well as their limitations and disadvantages in view of the objects of the present invention.

There are essentially two types of fasteners disclosed in the prior art which are relevant to the present invention.

That type wherein a rigid, substantially cylindrical member is passed completely through both objects or materials sought to be joined, and in some manner capped or expanded at either end in rivet-like fashion so as to remain in place while imparting a holding force, is represented in the Eakins Patent No. 2,458,152 and the Gibb Patent No. 3,036,728. The disadvantage of the type of fastener so disclosed is that the actual fastening requires a hole to be made in each of the materials to be joined, thus providing a point of leakage and possible failure when subjected to high longitudinal loading or severe mechanical shock. While the fastening means so disclosed may provide adequate protection against relatively light weight loads, it is obvious that when such a fastening is subjected to very high weights, as contemplated in the present invention, the required holes in the materials become primary points of leakage and failure.

The Seabrook Patent No. 1,468,519 and the Stubbs Patent No. 2,688,581 are representative of the second type of relevant art. These patents teach the extrusion of a material of continued plasticity through holes in an adjacent material so as to form a semi-integral fastening. While eliminating the problems attendant on passing a member completely through both joined objects or materials, it is readily seen that the extrusion methods are not readily adapted to the rapid assembly of rigid, preformed plastic members and their attendant non-plastic member.

The method most commonly used in the art prior to the present invention in accomplishing the more specific objectives of the present invention as set forth hereinafter, is the passage of a heavy metal bolt through the member to be attached and a plastic member, or vessel; a supporting force being maintained by a large metal nut and washer. While the possibilities of failure under heavy loads at the point of member or vessel penetration is somewhat alleviated depending upon the size of the washer used, water tight integrity of the vessel is lost, or, at best, retained at increased cost. A further disadvantage is that the cost of materials and labor in this method is considerably greater than that required for the present invention.

SUMMARY OF THE INVENTION

The present invention is best summarized as a means for fastening a non-plastic member to a plastic member comprising a non-plastic member defining an opening therethrough, said non-plastic member and said plastic member having mating surfaces in juxtaposed relationship, and an independent plastic fastener disposed in said opening, said fastener having a surface affixed to the plastic member and said fastener being in bearing contact with said non-plastic member directed toward said mating surfaces whereby the mating surfaces are retained in juxtaposition.

Although not limited thereto, the present invention has been found to be particularly suited to and advantageous in the connection of non-plastic members to a surface of a plastic vessel. Accordingly, the present invention will be described in connection with such use as illustrative of the novel principles of the present invention.

The strength, malleability, durability and light weight characteristics of plastics make them particularly adaptable for use in mono-unit construction of large vessels capable of sustaining great loads and enduring high degrees of mechanical shock. The problems attendant on attaching non-plastic objects, such as metal support members, become quite obvious when the hardness, coefficient of expansion, and modulus of elasticity differences of plastics and metals are considered. The disclosures of the prior art do not satisfactorily solve these problems. The present invention does provide a solution. As more particularly described hereinafter, the present invention provides an exceptionally strong fastening means, which, by avoiding complete penetration of a vessel wall and the necessity for threaded insertion, preserves the unitary strength and integrity of the vessel. At the same time, the method of achieving such fastening, while inexpensive, is particularly adaptable to rapid assembly of rigid preformed objects; whereas the extrusion methods previously taught are not.

It is therefore an object of the present invention to provide improved and simpler means for fastening together plastic and non-plastic members.

Another object of the present invention is to provide an improved means for fastening non-plastic objects to plastic vessels sustaining heavy loads so as to preserve the integrity and unitary strength of the vessel.

Yet another object of the present invention is to provide an improved means for fastening non-plastic objects to a plastic member in a manner compatible with rapid assembly of the rigid non-plastic objects and the plastic members while fulfilling other objectives hereinbefore stated at a cost substantially lower than that incurred previously with known fastening methods.

The novel features which are considered to be characteristic of the present invention, together with further objects and advantages thereof, will be better understood from the following description in which the invention is illustrated by way of example. It is expressly understood, however, that this description is for the purpose of illustration only and that the true spirit and the scope of the invention is defined by the accompanying claims.

BRIEF DESCRIPTION OF THE DRAWING

In the drawing:

FIGS. 1 and 2 are partial sectional views of the invention as described.

FIG. 3 is a plan view of the invention as described.

FIGS. 4 and 5 are partial sectional views of possible alternative configurations of the described invention.

DESCRIPTION OF THE PREFERRED EMBODIMENTS

Referring now to the drawings, and more particularly to FIGS. 1, 2 and 3 there is shown a non-plastic bearing plate 10 of a predetermined size and shape not here critical, which receives and supports support member 12. A roller caster and its bearing plate are depicted by way of example. The bearing plate 10 is preformed so as to define at least one opening 14 having a substantially frusto-conical shape, convergent toward the mating surface 20 of the bearing plate 10, which further defines a bearing shoulder 19.

The bearing plate 10 is placed adjacent to a mating surface 16 of a plastic member to which the bearing plate is to be attached. The bottom or lowermost outside surface of a preformed plastic vessel 18 is shown as illustrative of the utility of the present invention. The bearing plate is therefore so constructed and arranged relative to the vessel 18 that substantially the whole bearing plate mating surface 20 is in contact with the vessel mating surface 16. Extending inwardly from the vessel surface 16 there is defined by the vessel wall 15 a recess 22 which extends partially through the wall 15 of the vessel. The recess is of a cross-sectional configuration and depth substantially equal to but greater than the cross-sectional configuration and depth of the mating portion 25 of the plug 24 as described more fully hereinafter. The bearing plate, or non-plastic member, is positioned adjacent the vessel surface 16 such that the opening 14 is substantially aligned with the recess 22 defined in the vessel wall or lowermost surface 16 of the vessel 18.

The bearing plate 10 is supported in its predetermined position by at least one preformed plastic plug 24. In the presently preferred embodiment of this invention, the plug 24 is of such shape that the uppermost portion thereof 25 is substantially cylindrical and conforms to the recess 22 defined by the bottom wall of the vessel; the lower portion thereof being substantially frusto-conical in shape and conforming to the shape of the opening 14 defined by the plate 10. There is thus defined an inwardly directed supporting surface 17 which, when the plug is in the assembled position, is in bearing contact with the outwardly directed shoulder 19 of the opening through the bearing plate 10.

The cylindrical portion 25 of the plug 24 is coated with any suitable synthetic resinous adhesive or cement, such as one of the epoxy resins, adaptable for use with plastics but not herein claimed as part of the present invention. While the adhesive is still in a fluid state, the plug 24 is passed through the opening 14 of plate 10 and into the recess 22 of the vessel wall 15. By any method convenient to the assembler, the plug is held in place for the required curing time of the particular adhesive utilized. The plug is thus placed in rigid contact with the vessel 18 and the plate 10 thereby imparting a strong supporting force to said plate through the supporting surface 17.

Referring now to FIG. 4, there is shown an alternative embodiment 26 of the plug 24. Plug 26 is of substantially frusto-conical shape. With the alternative embodiment shown in FIG. 4 the necessity for the recess 22 is removed; the surface 16 of the vessel 18 being in contact with substantially the whole of the surface 30 of the plug 26.

Referring now to FIG. 5, there is shown an additional alternative embodiment 28 of the plug 24. The bearing plate 10 defines an opening having outwardly and inwardly directed supporting shoulders 34 and 36 respectively. A curable plastic material in a fluid state is allowed to cure in said opening so as to form a plastic plug 28. The bearing plate 10 is then placed adjacent a surface of the vessel so that when a suitable synthetic resinous adhesive is applied to the mating surfaces 32 and 16 of the plug and vessel respectively, said bearing plate and vessel are retained in juxtaposition.

There has thus been described a new and improved means of fastening non-plastic objects to plastic objects. The described invention provides a means for attaching non-plastic support or joining members to plastic members, such as vessels, which while maintaining a rigid fastening, preserves unimpaired the integrity and strength of a member subjected to heavy loads and severe mechanical shocks. Further, the present invention provides a fastening means which is readily and inexpensively adaptable to rapid assembly of large, rigid, preformed vessels where extrusion methods of fastening would be impractical of application.

What is claimed is:

1. The method of fastening a non-plastic member having a mating surface to a plastic vessel having a bottom undersurface, including the steps of:
    (a) Providing a substantially frusto-conically shaped recess in said bottom undersurface;
    (b) Providing an opening through said nonplastic member of varying cross-section to define a shoulder surface outwardly directed with respect to said mating surface;
    (c) Providing a substantially frusto-conical independent plastic fastener having a surface shaped to register with said recess and said shoulder surface;
    (d) Applying adhesive to said surface of said plastic fastener and the interior of said recess;
    (e) Placing the mating surface of said non-plastic member in juxtaposed relationship with said bottom undersurface whereby said recess and said opening are oppositely disposed; and,
    (f) Inserting said plastic fastener through said opening into registry with said recess and said shoulder surface, whereby said non-plastic member is maintained in juxtaposed relationship with said vessel bottom undersurface.

2. The method according to claim 1 wherein said recess is provided so as to maintain a sufficient thickness of said vessel bottom to preserve the unitary strength and integrity thereof.

References Cited

UNITED STATES PATENTS

| | | | |
|---|---|---|---|
| 1,468,519 | 9/1923 | Seabrook | 138—147 |
| 2,663,662 | 12/1953 | Graf et al. | 156—293X |
| 2,688,581 | 9/1954 | Stubbs | 156—231 |
| 2,366,274 | 1/1945 | Luth et al. | 156—293 |
| 2,898,258 | 8/1959 | Meier et al. | 156—293 |
| 3,030,951 | 4/1962 | Mandarino | 156—98X |

REUBEN EPSTEIN, Primary Examiner